US010055259B2

(12) United States Patent
Lo et al.

(10) Patent No.: US 10,055,259 B2
(45) Date of Patent: Aug. 21, 2018

(54) METHOD FOR PERFORMING PROCESSOR RESOURCE ALLOCATION IN AN ELECTRONIC DEVICE, AND ASSOCIATED APPARATUS

(71) Applicant: MEDIATEK INC., Hsin-Chu (TW)

(72) Inventors: Tzu-Jen Lo, New Taipei (TW); Yu-Ming Lin, Taipei (TW); Jia-Ming Chen, Hsinchu County (TW); Ya-Ting Chang, Hsinchu (TW); Nicholas Ching Hui Tang, Hsinchu County (TW); Yin Chen, Taipei (TW); Hung-Lin Chou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/967,387

(22) Filed: Dec. 14, 2015

(65) Prior Publication Data

US 2016/0350156 A1  Dec. 1, 2016

Related U.S. Application Data

(60) Provisional application No. 62/166,252, filed on May 26, 2015.

(51) Int. Cl.
*G06F 9/46* (2006.01)
*G06F 9/50* (2006.01)

(52) U.S. Cl.
CPC .................................... *G06F 9/505* (2013.01)

(58) Field of Classification Search
None
See application file for complete search history.

(56) References Cited

U.S. PATENT DOCUMENTS

| 2008/0065835 | A1* | 3/2008 | Iacobovici | G06F 12/0817 711/141 |
|---|---|---|---|---|
| 2008/0184042 | A1* | 7/2008 | Parks | G06F 1/3203 713/300 |
| 2010/0241758 | A1* | 9/2010 | Oddie | G06Q 10/06 709/231 |
| 2011/0131583 | A1* | 6/2011 | Geraci | G06F 9/505 718/104 |
| 2011/0213993 | A1* | 9/2011 | Greenhalgh | G06F 1/3203 713/320 |

(Continued)

*Primary Examiner* — Dong Kim
(74) *Attorney, Agent, or Firm* — Han IP Corporation; Andy M. Han

(57) ABSTRACT

A method for performing processor resource allocation in an electronic device is provided, where the method may include the steps of: obtaining task-related information to determine whether a task of a plurality of tasks is a heavy task (e.g. the heavy task may correspond to heavier loading than others of the plurality of tasks), to selectively utilize a specific processor core within a plurality of processor cores to perform the task, and determining whether at least one scenario task exists within others of the plurality of tasks, to selectively determine according to application requirements a minimum processor core count and a minimum operating frequency for performing the at least one scenario task; and performing processor resource allocation according to a power table and system loading, to perform any remaining portion of the plurality of tasks. An apparatus for performing processor resource allocation according to the above method is provided.

19 Claims, 6 Drawing Sheets

(56) References Cited

U.S. PATENT DOCUMENTS

| | | | | |
|---|---|---|---|---|
| 2012/0005683 A1* | 1/2012 | Bower, III | ............ | G06F 9/5094 |
| | | | | 718/103 |
| 2013/0219068 A1* | 8/2013 | Ballani | ................ | G06F 9/5061 |
| | | | | 709/226 |
| 2014/0165070 A1* | 6/2014 | Persikov | ............... | G06F 9/4881 |
| | | | | 718/103 |

* cited by examiner

METHOD FOR PERFORMING PROCESSOR RESOURCE ALLOCATION IN AN ELECTRONIC DEVICE, AND ASSOCIATED APPARATUS

CROSS REFERENCE TO RELATED APPLICATIONS

This application claims the benefit of U.S. Provisional Application No. 62/166,252, which was filed on May 26, 2015, and is included herein by reference.

BACKGROUND

The present invention relates to processor control of an electronic device, particularly to a performance on demand processor resource allocation method in an electronic device, and an associated apparatus.

According to the related art, as the progress of modern electronic devices, the CPU topology changed dramatically and also the diversity increased. For example, from symmetric multi-processor (SMP) to heterogeneous multi-processor (HMP), asymmetric multi-processor (AMP), and even hybrid architecture, developed for system flexibility, power efficiency, thermal strategy, product differentiation, etc. Compared with SMP, these non-SMP topologies are typically composed of asymmetric CPUs variant on physical characteristics, including micro-architecture, computing capability, and power efficiency. These physical variances between asymmetric non-SMP CPUs challenge traditional technologies of SMP hot-plugging and dynamic voltage and frequency scaling (DVFS) dramatically.

Conventional hot-plugging and DVFS, originated from SMP systems, are designed to adjust the number of active cores and the associated operating frequencies according to the system loading. For example, if the system loading is higher than a certain threshold, one or more cores may be plugged and frequency up-shifting may be performed. If the system loading is lower than a certain threshold, one or more cores may be un-plugged and frequency down-shifting may be performed. But SMP systems will not consider which cores to adjust, since all cores are not differentiated. On a non-SMP system, to balance between performance and low-power, decision making of hot-plugging and DVFS may become more complex. In addition, on a HMP, a bigger core may have better performance with higher power cost, while a smaller one may have more balanced power efficiency. According to physical characteristics, two small cores may provide the same computing capability as one big core, but with less total power consumption. However, a task is not always dividable, and the performance of running on one of the two small cores may be half of (or less than) that of the one big core. Therefore, performance and low-power balance may have become an important issue on modern mobile devices, especially on an asymmetric system. For example, choosing a wrong class of CPU may result in terrible user experience or unnecessary system power waste. The disclosed implementation method and the associated apparatus may be applied to one or a combination of various types of processor resources, such as the SMP architecture that typically has multiple cores with the same DMIPS (i.e. Dhrystone Million Instructions Per Second (MIPS)) and operating frequency (e.g. in unit of megahertz (MHz)), the HMP architecture that typically has multiple cores with different DMIPS and operating frequencies and different power consumption, and the AMP architecture that typically has multiple cores with the same DMIPS, but different operating frequencies or different manufacturing processes.

FIG. 1 is a diagram of a conventional method in the related art. For example, the conventional method may comprise processor resources 110 including a plurality of processor cores (e.g. central processing unit (CPU) cores), examples of which may comprise the processor cores $CPU_X$, $CPU_Z$, $CPU_Y$, $CPU_L$, and $CPU_T$ shown around the upper most of FIG. 1. A processor core depicted with dashed lines indicates that this processor core is hot-unplugged (e.g. the power thereof may be temporarily turned off). A processor core depicted with non-dashed lines indicates that this processor core is hot-plugged (e.g. the power thereof may be temporarily turned on) and operated in its full or partial capability, depends on the ratio of non-dashed lines compared to dashed lines. The shaded content(s) depicted in a processor core indicates the working load of this processor core compared to its computing capability. The statuses of the processor cores may vary from time to time.

According to the related art, the conventional method may operate legacy hot-plug/DVFS method. For example, in the first transition taking around 10 milliseconds (ms) or more, the DVFS operation of the conventional method may up shift the online CPU frequency to a reasonable level (which may be the maximum capability of the online CPU). In the second transition taking around 100 ms or more, when the existing online CPUs cannot handle the overall system loading, the hot-plug operation of the conventional method may strategically enable CPU(s) to ease workload tensions. The strategies of enabling CPUs may be the consideration of most powerful, most power efficient, most power saving, etc. However, the conventional method encounters some problems. For example, the conventional method may be late to response, the independent usage of hot-plugging and DVFS may cause extra delay and response time.

As mentioned, there are some problems in the related art. Thus, a novel method is required to enhance the processor control of an electronic device.

SUMMARY

It is an objective of the claimed invention to provide a method for performing processor resource allocation in an electronic device, and an associated apparatus, in order to solve the above-mentioned problems.

According to at least one embodiment, a method for performing processor resource allocation in an electronic device is provided, where the method may comprise the steps of: obtaining task-related information to determine whether a task of a plurality of tasks is a heavy task (e.g. the heavy task may correspond to heavier loading than others of the plurality of tasks), to selectively utilize a specific processor core within a plurality of processor cores to perform the task, and determining whether at least one scenario task exists within others of the plurality of tasks, to selectively determine according to application requirements a minimum processor core count and a minimum operating frequency for performing the at least one scenario task; and performing processor resource allocation according to a power table and system loading, to perform any remaining portion of the plurality of tasks. According to some embodiments, an apparatus for performing processor resource allocation according to the above method is provided, where the apparatus may comprise at least one portion (e.g. a portion or all) of the electronic device.

According to at least one embodiment, an apparatus for performing processor resource allocation in an electronic device is provided, where the apparatus may comprise at least one portion (e.g. a portion or all) of the electronic device. For example, the apparatus may comprise a plurality of processor cores that may be positioned within the electronic device, and may further comprise a control circuit that may be embedded within the plurality of processor cores or positioned outside the plurality of processor cores. The plurality of processor cores may be arranged for selectively performing operations for the electronic device. In addition, the control circuit may be arranged for obtaining task-related information to determine whether a task of a plurality of tasks is a heavy task (e.g. the heavy task may correspond to heavier loading than others of the plurality of tasks), to selectively utilize a specific processor core within the plurality of processor cores to perform the task, and determining whether at least one scenario task exists within others of the plurality of tasks, to selectively determine according to application requirements a minimum processor core count and a minimum operating frequency for performing the at least one scenario task. In addition, the control circuit performs processor resource allocation according to a power table and system loading, to perform any remaining portion of the plurality of tasks.

It is an advantage of the present invention that, for a given set of processor resources, such as the plurality of processor cores mentioned above, the present invention method and the associated apparatus can allocate necessary processor cores based on performance requirements with energy concerns. For example, by performing processor hot-plugging (e.g. central processing unit (CPU) hot-plugging or CPU core hot-plugging) and dynamic voltage and frequency scaling (DVFS), the present invention method and the associated apparatus may try to make the best decision between clusters and CPUs with different physical characteristics of computing capability and power efficiency, to fulfill performance requirements for an energy efficient system. As both of user experience and power saving are quite sensitive in milliseconds, the present invention method and the associated apparatus may perform hot-plugging and DVFS in a susceptible manner to twinkle changeable performance requirements and responses an appropriate adjustment with energy concerns. In addition, the present invention method and the associated apparatus can perform power control properly with fewer side effects. In comparison with the related art, the present invention method and the associated apparatus can prevent, or greatly decrease the probability of, improper core allocation and/or improper frequency allocation. As a result, the best overall performance of an electronic device may be achieved.

These and other objectives of the present invention will no doubt become obvious to those of ordinary skill in the art after reading the following detailed description of the embodiments that are illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
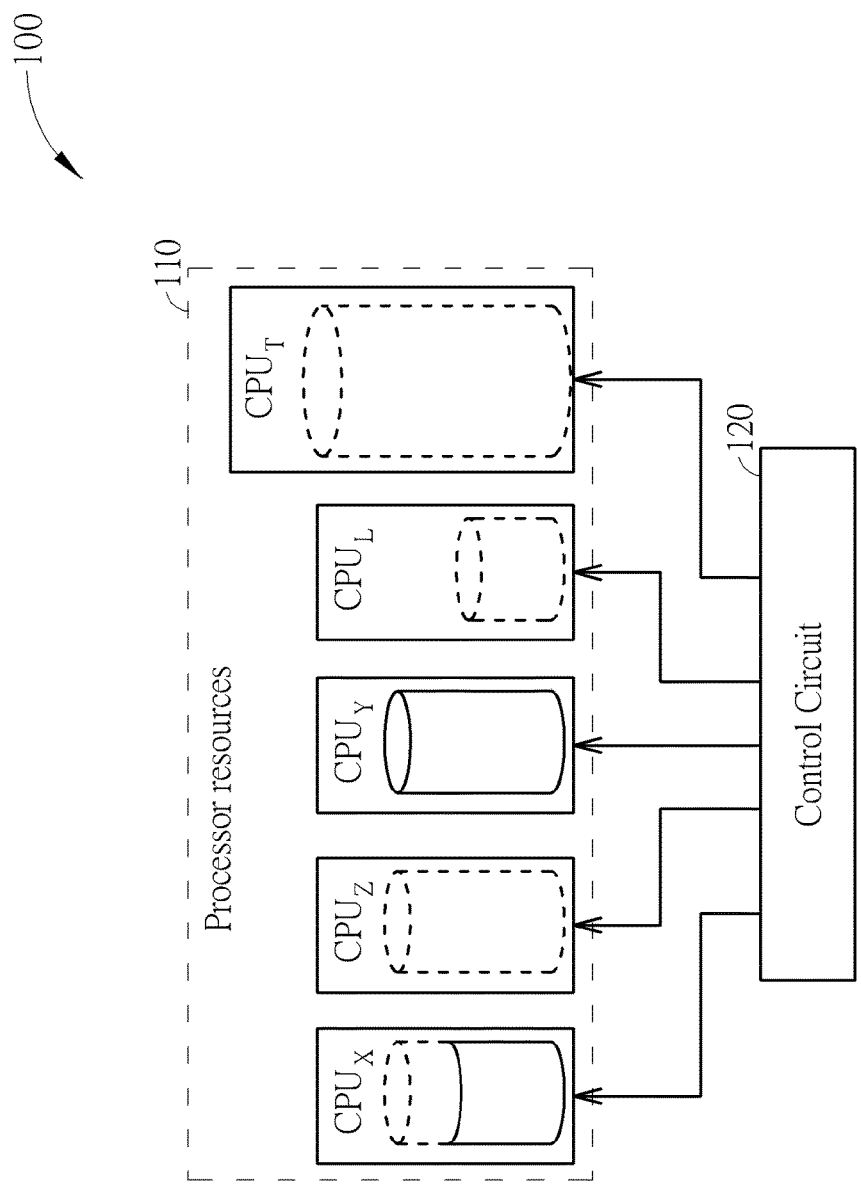
FIG. 2 is a diagram of an apparatus for performing processor resource allocation in an electronic device according to an embodiment of the present invention.

FIG. 2 is a diagram of an apparatus 100 for performing processor resource allocation in an electronic device according to an embodiment of the present invention, where the apparatus 100 may comprise at least one portion of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless communications system comprising the electronic device). Examples of the electronic device may include, but not limited to, a mobile phone (e.g. a multifunctional mobile phone), a tablet, and a personal computer such as a laptop computer or a desktop computer.

According to this embodiment, the apparatus 100 may comprise the aforementioned processor resources 110 including a plurality of processor cores, which may be positioned within the electronic device in this embodiment. For example, the apparatus 100 may comprise at least one processor in the electronic device, and the aforementioned at least one processor may comprise the plurality of processor cores. For better comprehension, the processor cores $CPU_X$, $CPU_Z$, $CPU_Y$, $CPU_L$, and $CPU_T$ are illustrated as examples of the plurality of processor cores of this embodiment. As shown in FIG. 2, the apparatus 100 may further comprise a control circuit 120 that may be positioned outside the plurality of processor cores. According to some embodiments, the control circuit 120 may be embedded within the plurality of processor cores. For example, the control circuit 120 may be implemented with the aforementioned at least one processor having at least one program module running thereon, such as a kernel program module modified from an existing kernel of an operating system (OS).

As shown in FIG. 2, the processor core $CPU_X$ partially depicted with solid lines indicates that the processor core $CPU_X$ is online (which means the processor core $CPU_X$ may be hot-plugged, for example, the power thereof may be temporarily turned on) and is operating not at a maximum operating frequency since the rest dashed line depicted the unused frequency capability, while the processor core $CPU_Y$ completely depicted with solid line indicates that the processor core $CPU_Y$ is online (which means the processor core $CPU_Y$ may be hot-plugged, for example, the power thereof may be temporarily turned on) and is operating at a maximum operating frequency, where the cores $CPU_Z$, $CPU_L$, and $CPU_T$ completely depicted with dashed lines indicate that the processor cores $CPU_Z$, $CPU_L$, and $CPU_T$ are offline (which means the processor cores $CPU_Z$, $CPU_L$, and $CPU_T$ may be hot-unplugged, for example, the power thereof may be temporarily turned off). Same radius with half total height depicted that the processor cores have same DMIPS, but the ratio of the maximum operating frequency is 1:2, for example $CPU_X$, $CPU_Y$, and $CPU_Z$ compare to $CPU_L$. And greater radius indicates that the processor core has higher DMIP. As the height of the processor core $CPU_T$ is greater than that of the processor cores $CPU_X$, $CPU_Y$, and $CPU_Z$, the maximum operating frequency of the processor core $CPU_T$ is higher than that of the processor cores $CPU_X$, $CPU_Y$, and $CPU_Z$. The statuses of any of the plurality of processor cores, such as that of any of the processor cores $CPU_X$, $CPU_Z$, $CPU_Y$, $CPU_L$, and $CPU_T$ shown in FIG. 2, may vary from time to time.

Figure 1:
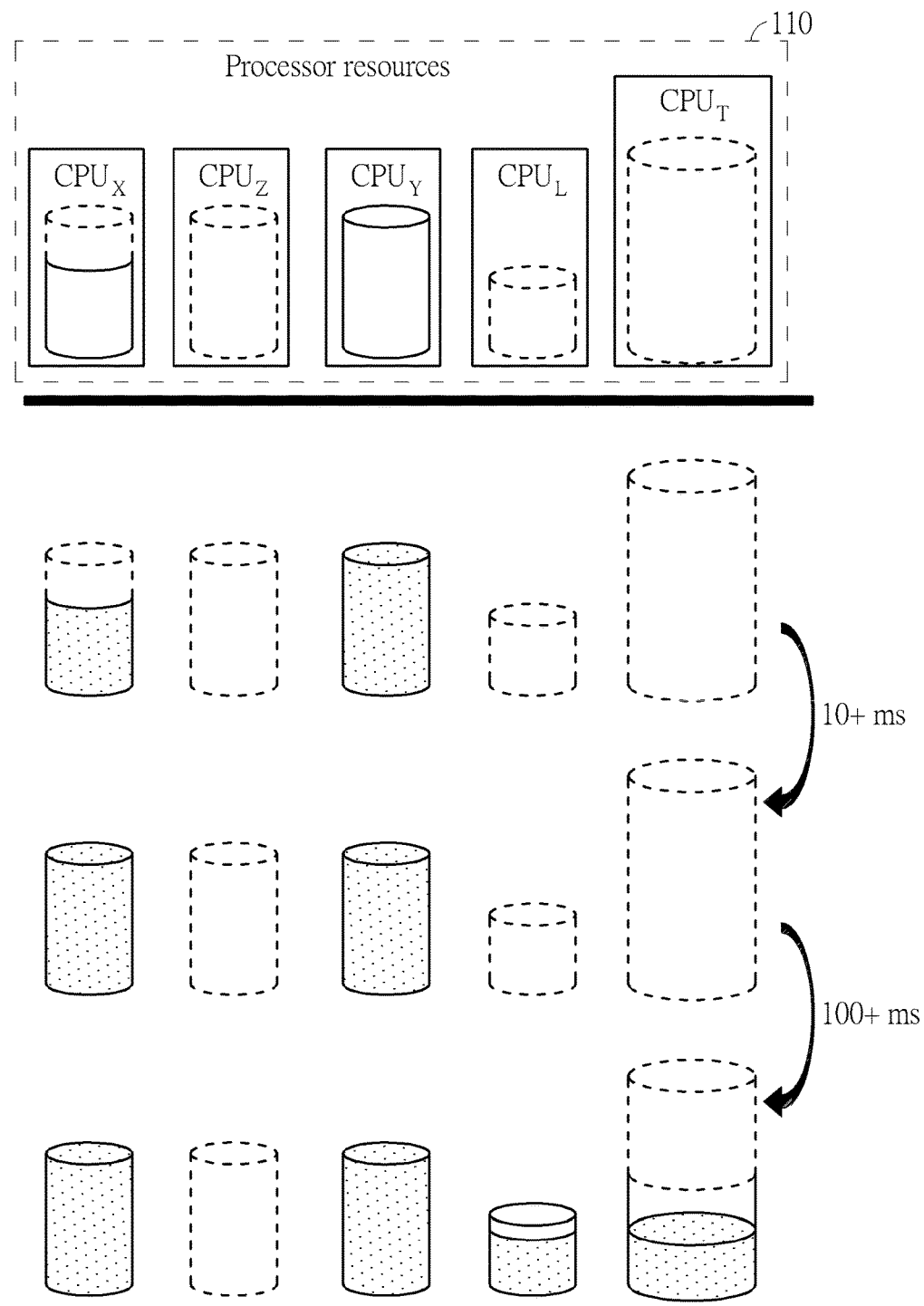
FIG. 1 is a diagram of a conventional method in the related art.

As any of the plurality of processor cores may be temporarily hot-plugged or hot-unplugged, the plurality of processor cores may be arranged for selectively performing operations for the electronic device. In addition, the control circuit 120 may be arranged for classifying the plurality of tasks into a plurality of categories, and further assigning or re-assigning one or more tasks to one or more of the plurality of processor cores according to whether the aforementioned one or more tasks belong to which of the plurality of categories. According to this embodiment, the control scheme may be utilized for fulfilling performance requirement with energy efficient concerns, applicable for any modern CPU topology, including but not limited to SMP, HMP, AMP, and hybrid architecture. Besides system overall loading, the control scheme may take into consideration the computing requirement varying task by task, which should be treated individually and not to mingle with the concept of system loading. For example, the control scheme categorizes performance-concerned tasks by characteristics, including but not limited to tasks for frame rendering and tasks with heavy loading, to allocate desired number of cores and corresponding class or frequency. Based on performance demanded number of cores, class, frequency, and overall system loading, the control scheme refers to a power table for minimum power consumption, which satisfies system-wide requirements. As a result, the apparatus 100 of this embodiment may resolve the above problems of the conventional method shown in FIG. 1.

According to some embodiments, for a given set of CPU resources, the apparatus 100 operating according to the control scheme may allocate necessary CPUs based on performance requirements and energy concerns. For example, by utilizing CPU hot-plugging and DVFS, the apparatus may try to make the best decision between cluster(s) and CPU(s) with different physical characteristics of computing capability and power efficiency to fulfill performance requirements.

Figure 3:
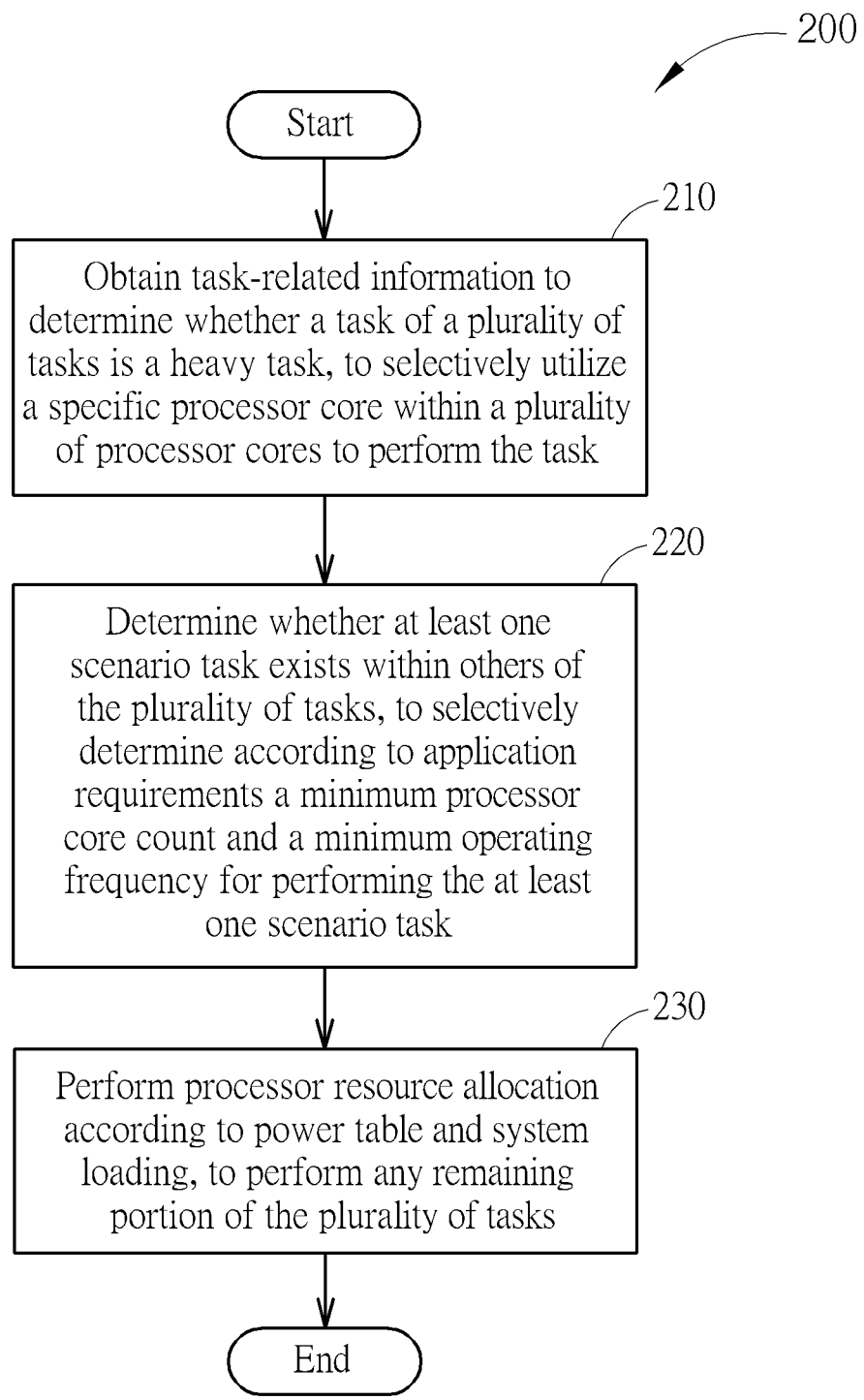
FIG. 3 illustrates a flowchart of a method for performing processor resource allocation in an electronic device according to an embodiment of the present invention.

FIG. 3 illustrates a flowchart of a method 200 for performing processor resource allocation in an electronic device according to an embodiment of the present invention. The method 200 shown in FIG. 3 can be applied to the apparatus 100 shown in FIG. 2 and the aforementioned at least one processor thereof, and can be applied to the control circuit 120 mentioned above, no matter whether the control circuit 120 is positioned outside the plurality of processor cores of the embodiment shown in FIG. 2 or embedded within the plurality of processor cores of some embodiments described above.

In Step 210, the control circuit 120 may obtain task-related information to determine whether a task of a plurality of tasks is a heavy task, then selectively utilize a specific processor core within a plurality of processor cores to perform the task, where the specific processor core may be a processor core having higher computing capability than others of the plurality of processor cores, in order to satisfy the requirement of the heavy task. For example, when the task is the heavy task, the control circuit 120 may utilize the specific processor core (e.g. the processor core having higher computing capability than the others of the plurality of processor cores and satisfying the requirement of the heavy task) to perform the task. In order to achieve the best performance, the specific processor core may operate at the highest operating frequency thereof, such as the maximum operating frequency available for the specific processor core. According to some embodiments, the task-related information may be obtained from a program module running on the electronic device, such as the kernel program.

For example, the task-related information may comprise a queue time, which represents a time period that the task is in the queue, and may further comprise a successive execution time, which represents a time period that the task is executed right after the queue. The control circuit 120 may determine whether the summation of the queue time and the execution time satisfies a predetermined criterion (e.g. this may indicate that the heavy task corresponds to heavier loading than others of the plurality of tasks), to determine whether the task is the heavy task. For example, when the summation of the queue time and the execution time reaches a predetermined time threshold, the control circuit 120 may determine that the task is the heavy task. In another example, when the ratio of the summation of the queue time and the execution time to a certain time period reaches a predetermined ratio threshold, the control circuit 120 may determine that the task is the heavy task.

In Step 220, the control circuit 120 may determine whether at least one scenario task exists within others of the plurality of tasks, to selectively determine according to application requirements a minimum processor core count and a minimum operating frequency for performing the aforementioned at least one scenario task. For example, when the aforementioned at least one scenario task exists, the control circuit 120 may determine according to the application requirements for the minimum processor core count and the minimum operating frequency for performing the aforementioned at least one scenario task. More particularly, when the aforementioned at least one scenario task exists, the control circuit 120 may utilize at least one other processor core within the others of the plurality of processor cores to perform the aforementioned at least one scenario task, where the number of the aforementioned at least one other processor core is greater than or equal to the minimum processor core count, and the operating frequency of the aforementioned at least one other processor core is greater than or equal to the minimum operating frequency required by the application for the scenario task.

In Step 230, the control circuit 120 may perform processor resource allocation according to the power table and system loading, to perform any remaining portion of the plurality of tasks, such as the other task(s) within the plurality of tasks. For example, the control circuit 120 may sum up a workload of all remaining tasks and then perform table lookup operation(s) according to the power table, to adjust the number of processor cores and share the overall workload, where the chosen processor core(s) corresponding to the least power consumption may have the highest priority to be utilized in Step 230.

In some embodiments, the control circuit 120 may take into consideration the power table and the overall workload, to select the best-fitted allocation, which fulfills the system requirement with the lowest power cost. For example, the system loading in these embodiments may be a number to represent overall workload, while diverse task characteristics may not be considered.

According to some embodiments, the control circuit 120 may perform loading measurement on the task to generate a loading measurement result. Examples of the loading measurement result may include, but not limited to, the queue time, the execution time, and a derivative of both of the queue time and the execution time (e.g. the summation of the queue time and the execution time, or the ratio of the summation of the queue time and the execution time to the certain time period). In addition, the control circuit 120 may generate the task-related information mentioned in Step 210 according to the loading measurement result. For example, in Step 210, when the loading measurement result reaches a predetermined threshold (e.g. the predetermined time threshold or the predetermined ratio threshold, based on different examples of the predetermined criterion), the control circuit 120 may determine that the task of the plurality of tasks is the heavy task. For better illustration, the loading measurement result may vary within the range from 0% through to 100%, and the predetermined threshold may be defined as 90% or another fixed value, based on various requirements. This is for illustrative purposes only, and is not meant to be a limitation of the present invention.

According to some embodiments, such as one or more of the embodiments shown in FIGS. 4-7, the control circuit 120 may categorize the plurality of tasks into the plurality of categories, where the plurality of categories may comprise a "heavy task category", a "scenario category", and an "others category".

TABLE 1

| Category | | Heavy task | Scenario | Others |
|---|---|---|---|---|
| Number of tasks | | $N_{HT}$ | $N_{SCE}$ | $N_{OTH}$ |
| Accumulated loading | | $AccLoad_{HT}$ | $AccLoad_{SCE}$ | $AccLoad_{OTH}$ |
| Most powerful CPU | Cores Frequency | $N_{HT}$ $F_{MAX}$ | | |
| System-wide CPU | Cores Frequency | | $N_{SCE} \uparrow$ $F_{SCE} \uparrow$ | |

For example, the control circuit 120 may classify the plurality of tasks into the plurality of categories by characteristics of the tasks, such as the categories listed in Table 1. Examples of the plurality of categories may include, but not limited to, the heavy task category (labeled "Heavy task" in Table 1), the scenario category (labeled "Scenario" in Table 1), and the aforementioned others category (labeled "Others" in Table 1). The heavy task category may correspond to the heavy task mentioned in Step 210, the scenario category may correspond to the at least one scenario task mentioned in Step 220, and the others category may correspond to the remaining portion of the plurality of tasks (i.e. the remaining portion mentioned in Step 230). For example, the at least one scenario task mentioned in Step 220 may comprise at least one frame rendering task. For better comprehension, the frame rendering task can be taken as an example of the scenario category, where a number $N_{FPS}$ of tasks corresponding to the frame rendering task, an accumulated loading parameter $AccLoad_{FPS}$, and a predetermined operating frequency $F_{FPS}$ can be taken as an example of the number $N_{SCE}$ of tasks corresponding to the scenario category, the accumulated loading parameter $AccLoad_{SCE}$, and the predetermined operating frequency $F_{SCE}$, respectively.

Regarding the scenario category, suppose that the apparatus 100 is updating a frame by performing one or more tasks corresponding to frame rendering. The control circuit 120 may determine some parameters associated with the scenario category, such as a set of frame per second (FPS) parameters. For example, there may be $N_{FPS}$ frame rendering tasks, where the number $N_{FPS}$ is an integer greater than or equal to zero. Examples of the set of FPS parameters may include (but not limited to):

(F0). The accumulated loading parameter $AccLoad_{FPS}$, i.e. the accumulated loading corresponding to frame rendering task(s);

(F1). The minimum number of online cores that are required for frame rendering task(s) within the plurality of processor cores, such as a number that is equal to $N_{FPS}$; and (F2). The minimum frequency required for these online cores, such as the predetermined operating frequency $F_{FPS}$.

To satisfy the requirements of frame rendering task(s), the number of online cores that are required for frame rendering task(s) within the plurality of processor cores can be equal to or greater than $N_{FPS}$, and the operating frequency of each processor cores applied to the frame rendering tasks may be equal to or greater than $F_{FPS}$.

Regarding the heavy task category, the control circuit 120 may determine some parameters associated to the heavy task category. For example, there may be $N_{HT}$ heavy loading tasks within the plurality of tasks mentioned in Step 210, where the number $N_{HT}$ is an integer greater than or equal to zero. Examples of the set of heavy task (HT) parameters may include (but not limited to):

(H0). The accumulated loading parameter $AccLoad_{HT}$, i.e. the accumulated loading corresponding to heavy task(s); and (H1). The number of most powerful processor cores (e.g. most powerful CPU cores) that are required for heavy task(s) within the plurality of processor cores, such as a number that is equal to $N_{HT}$. According to some embodiments, when the power is sufficient and there is no need to save power, the number of most powerful processor cores that are required for heavy task(s) within the plurality of processor cores can be a number that is greater than or equal to $N_{HT}$. According to some embodiments, each processor core of the plurality of processor cores may be the processor core of a single core processor, and therefore the set of HT parameters may include the number of most powerful processors in these embodiments.

Regarding the others category, for example, suppose there are $N_{OTH}$ other tasks, where the number $N_{OTH}$, i.e. the task count of the aforementioned other tasks, is an integer greater than or equal to zero. The control circuit 120 may determine some parameters associated to the others category, such as the accumulated loading parameter $AccLoad_{OTH}$, i.e. the accumulated loading corresponding to other task(s).

Figure 4:
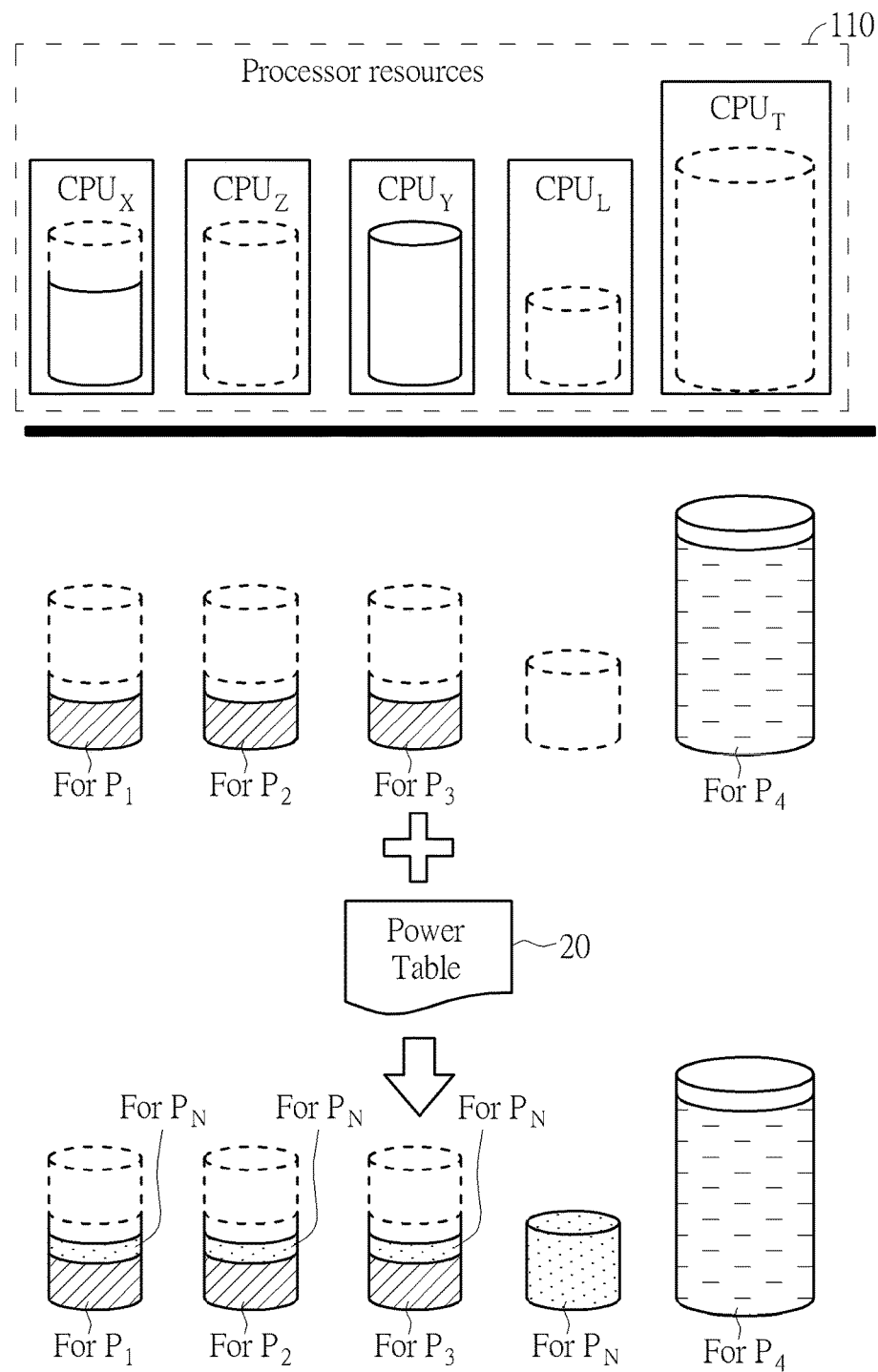
FIG. 4 illustrates a control scheme involved with the method shown in FIG. 3 according to an embodiment of the present invention.

FIG. 4 illustrates a control scheme involved with the method 200 shown in FIG. 3 according to an embodiment of the present invention. According to the task count $N_{HT}$ of the heavy tasks, the control circuit 120 may determine the number of most powerful processor cores (e.g. most powerful CPU cores) to be a proper value for efficiently completing the $N_{HT}$ heavy tasks. And each most powerful processor core may be working at the maximum operating frequency available $F_{MAX}$. As shown in FIG. 4, the height and radius indicates that the processor core $CPU_T$ is the most powerful processor cores.

The plurality of tasks may comprise a set of frame rendering tasks $P_1$, $P_2$, and $P_3$, a heavy task $P_4$, and one or more other tasks $P_N$. The control circuit 120 may assign the processor core $CPU_T$ to perform the heavy task $P_4$, with the processor core $CPU_T$ working at least at a minimum operating frequency required by the heavy task $P_4$. In addition, with aid of the power table 20, the control circuit 120 may assign the processor cores $CPU_X$, $CPU_Z$, and $CPU_Y$ to perform the set of frame rendering tasks $P_1$, $P_2$, and $P_3$, respectively. Additionally, the control circuit 120 may assign the processor core $CPU_L$ together with part of capability of the processor cores $CPU_X$, $CPU_Z$, and $CPU_Y$ to perform the aforementioned one or more other tasks $P_N$. In general, when allocating processing resource for one or more other tasks $P_N$, the control circuit 120 may refer to the power table 20 for configurations corresponding to the minimum power consumption. The principle of the method typically satisfies the following requirements:

(R1). At least $N_{HT}$ most powerful processor cores online, each of which working at the maximum operating frequency available $F_{MAX}$ for these most powerful processor cores;

(R2). Besides heavy tasks, the apparatus 100 handles accumulated loading of scenario tasks or tasks from apps. With at least $N_{SCE}$ processor cores being online, each of which working at a required operating frequency, such as the predetermined operating frequency $F_{SCE}$ or above; and (R3). Base on power efficiency concerns, use power table to allocate processor cores for one or more other tasks.

In the $N_{SCE}$ processor cores in the requirement R2, the $N_{HT}$ most powerful processor cores may be excluded, which means the $N_{HT}$ most powerful processor cores are not within the group of $N_{SCE}$ processor cores. In addition, with the above requirement R1 being satisfied, in Step 210, when the task is the heavy task, the control circuit 120 may utilize a set of specific processor cores within the plurality of processor cores, such as the $N_{HT}$ most powerful processor cores, to perform the task mentioned in Step 210, where the set of specific processor cores comprises the specific processor core. For example, each of the set of specific processor cores may operate at the highest operating frequency thereof, such as the maximum operating frequency available $F_{MAX}$. Typically, the set of specific processor cores may correspond to the highest computing capability with respect to the plurality of processor cores, and the set of specific processor cores (such as the $N_{HT}$ most powerful processor cores) can be utilized for completing the heavy task as soon as possible. In some embodiments, when the task mentioned in Step 210 is the heavy task, the control circuit 120 may utilize the set of specific processor cores within the plurality of processor cores to perform a set of heavy tasks (which may comprise the task mentioned in Step 210) such as the $N_{HT}$ heavy tasks, respectively. For example, each of the set of specific processor cores may operate at the highest operating frequency thereof, such as the maximum operating frequency available $F_{MAX}$.

Figure 5:
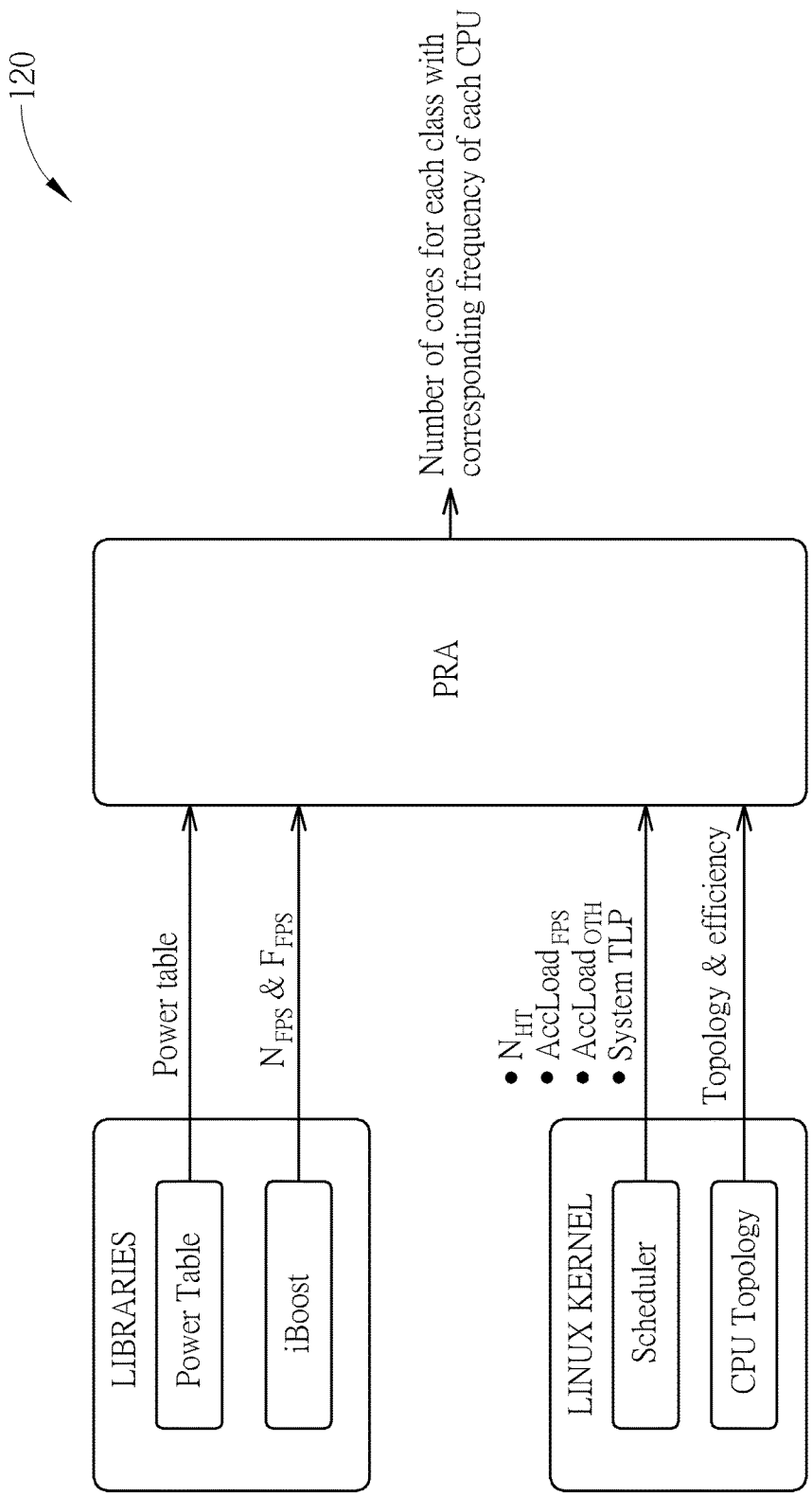
FIG. 5 illustrates some implementation details of the control circuit shown in FIG. 2 according to an embodiment of the present invention.

FIG. 5 illustrates some implementation details of the control circuit 120 shown in FIG. 2 according to an embodiment of the present invention, where the control circuit 120 may be implemented with the aforementioned at least one processor having a plurality of program modules running thereon. For example, the plurality of program modules may comprise a Linux kernel program module (labeled "LINUX KERNEL" in FIG. 5, for brevity), a library program module (labeled "LIBRARIES" in FIG. 5, for brevity), and a processor resource allocation (PRA) program module (labeled "PRA" in FIG. 5, for brevity). Please note that the Linux kernel program module can be taken as an example of the aforementioned kernel program module modified from the existing kernel of the OS in the embodiment shown in FIG. 2. In addition, the Linux kernel program module may comprise some sub-modules such as a scheduler and a CPU topology unit (labeled "CPU Topology" in FIG. 5, for brevity), and the library program module may comprise some sub-modules such as the power table (e.g. the power table 20) and FIG. 5 an i-boost unit (labeled "iBoost" in FIG. 5, for brevity).

As shown in FIG. 5, the processor resource allocation program module may obtain contents of the power table from the library program module, and may obtain the number $N_{SCE}$, i.e. the task count of the aforementioned scenario tasks, and the predetermined operating frequency $F_{SCE}$ from the i-boost unit imbedded within the performance service unit of the library program module. As the Linux kernel program module may determine some parameters that are further needed for performing processor resource allocation operations, the processor resource allocation program module may obtain these parameters from the Linux kernel program module and perform the processor resource allocation operations according to these parameters. For example, the scheduler of the Linux kernel program module may determine the number $N_{HT}$ (i.e. the task count of the aforementioned $N_{HT}$ heavy tasks), the accumulated loading parameter $AccLoad_{FPS}$ (i.e. the accumulated loading corresponding to frame rendering task(s)), the accumulated loading parameter $AccLoad_{OTH}$ (i.e. the accumulated loading corresponding to other task(s)), and the system TLP. For example, in Step 230, the control circuit 120 may check the system TLP, to determine whether Step 210 should be re-entered, and in a situation where Step 210 is re-entered, re-performing some operations regarding processor resource allocation (e.g. the operations of the working flow starting from Step 210) may be required. This is for illustrative purposes only, and is not meant to be a limitation of the present invention. In addition, the CPU topology unit may determine information regarding topology and efficiency, such as CPU topology information and CPU efficiency information. As a result, the processor resource allocation program module may perform the processor resource allocation operations according to the parameters and the power table that are obtained from the Linux kernel program module and according to the other parameters obtained from the library program module, to dynamically determine a plurality of processor resource allocation control parameters. For example, the plurality of processor resource allocation control parameters may comprise the number of cores for each class (more particularly, each category of the plurality of categories), such as the number of most powerful processor cores for the heavy task category (e.g. a number that is equal to $N_{HT}$) and the minimum number of online cores that are required for frame rendering task(s) for the scenario task category (e.g. a number that is greater than or equal to $N_{SCE}$). In addition, the plurality of processor resource allocation control parameters may further comprise the corresponding frequency of each processor core concerned (labeled "corresponding frequency of each CPU" in FIG. 6, for better comprehension), such as the maximum operating frequency available regarding the most powerful processor cores for the heavy task category (e.g. $F_{MAX}$) and the minimum frequency required for these online cores (e.g. the predetermined operating frequency $F_{SCE}$). According to some embodiments, examples of the corresponding frequency of each processor core concerned may further comprise the aforementioned other predetermined operating frequency that is greater than the predetermined operating frequency $F_{SCE}$, i.e. the other predetermined operating frequency determined for the processor core(s) having lower DMIPS in the embodiment shown in FIG. 5. For brevity, similar descriptions for this embodiment are not repeated in detail here.

According to some embodiments, when one or more of the number $N_{SCE}$ (i.e. the task count of the aforementioned scenario tasks), the minimum frequency required for these online cores (e.g. the predetermined operating frequency $F_{SCE}$), and the number $N_{HT}$ (i.e. the task count of the aforementioned $N_{HT}$ heavy tasks) are varied, the processor resource allocation program module may re-perform the processor resource allocation operations according to the latest parameters and the power table, to update the plurality of processor resource allocation control parameters. For brevity, similar descriptions for this embodiment are not repeated in detail here.

Figure 6:
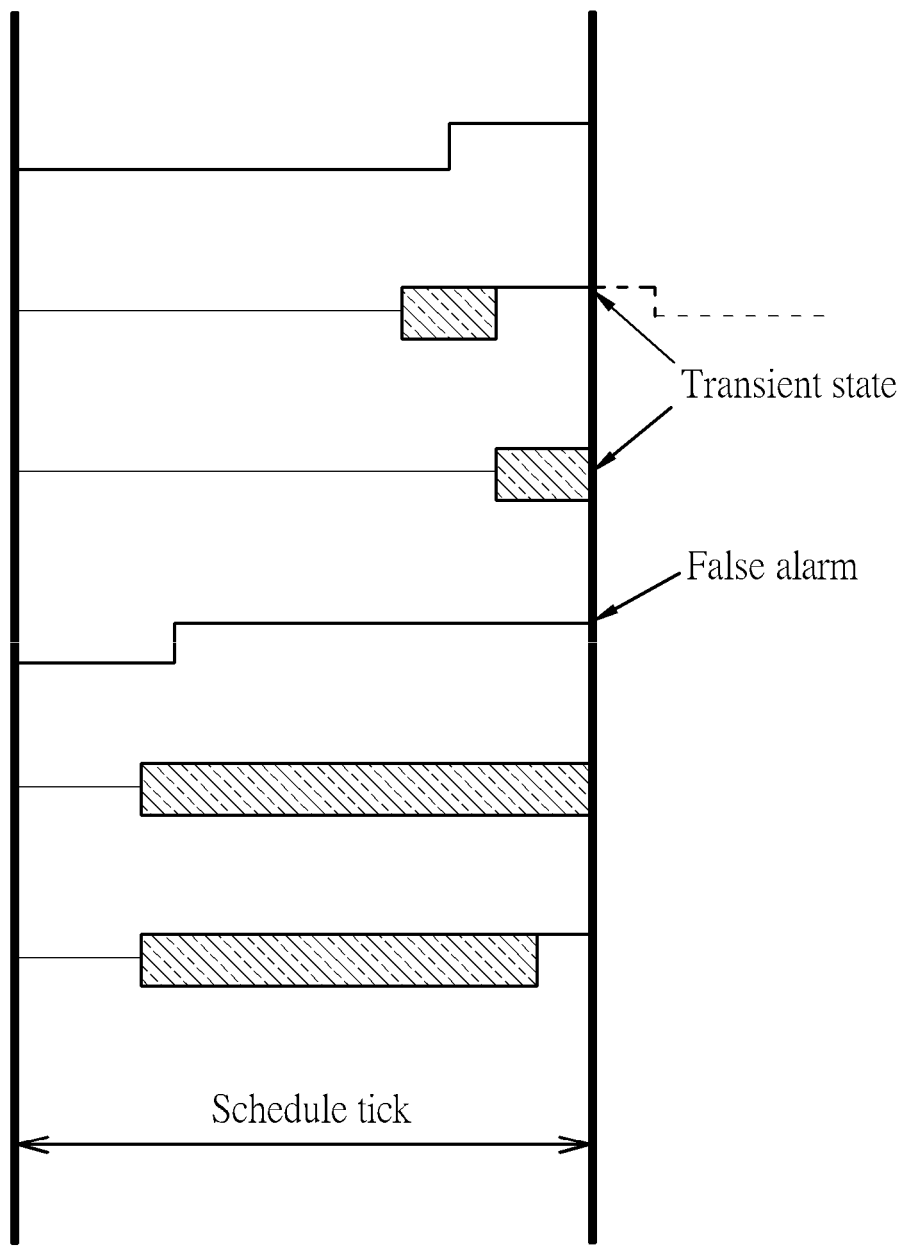
FIG. 6 illustrates a timing chart involved with the method shown in FIG. 3 according to an embodiment of the present invention.

FIG. 6 illustrates a timing chart involved with the method 200 shown in FIG. 3 according to an embodiment of the present invention. According to this embodiment, during performing the processor resource allocation operations, the control circuit 120 (more particularly, the processor resource allocation program module) not only controls the processor resources 110 in response to the tasks with heavy loading and the tasks for frame rendering, but also cares the system TLP.

For example, the schedule tick shown in FIG. 6 may be a Linux-defined time period for checking (e.g. ten milliseconds, or another predetermined length of time), and the curves shown in FIG. 6, starting from the top to the bottom, can be referred to as the first curve through to the eighth curve in this embodiment. As shown in FIG. 6, a curve that is depicted with bold lines, such as the first curve (i.e. the uppermost curve), may indicate that a corresponding task is running during the schedule tick shown in FIG. 6. Similarly, a partial curve that is depicted with bold line(s), such as a right portion of the second curve, may indicate that a corresponding task is running during a smaller length of time in which the bold line(s) are illustrated, while a partial curve that is depicted with non-bold line(s), such as a left portion of the second curve, may indicate that the corresponding task is non-wakened (which may be regarded as "sleeping" in some embodiment, for better comprehension) during the time in which the non-bold line(s) are illustrated, where a shaded portion of a curve, such as a the shaded portion of the second curve, may indicate that the corresponding task is wakened but no processor core is assigned to perform this task during the time in which the shaded portion is illustrated.

In the real world, the system TLP typically alters in every moment while the apparatus 100 is scheduling enqueues and dequeues, whose behavior may be too frequent for the apparatus 100 to react for each change. A general compromised implementation may be sample-based tracking. In addition, when trying to increase CPU resources by referring to the system TLP, a sample-based method may bring some issues. For example, the most serious one is that a transient state may be sampled, and therefore a false alarm may occur. Considering a task that is just waken up before sampling at a sampling time point, the system TLP will increase at this sampling time point, but the apparatus 100 may give up running this task at the next millisecond.

According to this embodiment, a "runnable duration" TLP may be introduced to be utilized as the system TLP, to reflect whether the CPU resources are or are not sufficient. For example, under control of the control circuit 120 (more particularly, the processor resource allocation program module), except for heavy and frame rendering tasks, any task that satisfies the following formula may trigger the processor resource allocation program to re-allocate CPU resources:

$$((T_{RUNNABLE} * N_{ONLINE\_CPU})/T_{ACC\_ONLINE\_CPU}) > X\%;$$

where the notation "$T_{RUNNABLE}$" may represent the runnable time (e.g. the time during which there is no processor core for running this task), the notation "$N_{ONLINE\_CPU}$" may represent the number of online processor cores, the notation "$T_{ACC\_ONLINE\_CPU}$" may represent the system-wide accumulated time of online processor cores, and the notation "X %" may represent a predetermined threshold such as a predetermined percentage. The predetermined percentage (i.e. X %) can be taken as an example of the predetermined ratio threshold. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing processor resource allocation in an electronic device, the method comprising the steps of:
    obtaining task-related information to determine whether a task of a plurality of tasks is a heavy task, to selectively utilize a specific processor core within a plurality of processor cores to perform the task;
    determining whether at least one scenario task exists within others of the plurality of tasks;
    determining according to application requirements a minimum processor core count and a minimum operating frequency for performing the at least one scenario task; and
    performing processor resource allocation according to a power table and system loading, to perform any remaining portion of the plurality of tasks,
    wherein the task-related information comprises a queue time and an execution time, the queue time representing a time period that the task is in a queue, the execution time representing a time period for execution of the task, and
    wherein the task is determined to be the heavy task in response to a derivative of the queue time and the execution time satisfying a predetermined criterion.

2. The method of claim 1, wherein the step of determining according to the application requirements the minimum processor core count and the minimum operating frequency for performing the at least one scenario task further comprises:
    when the at least one scenario task exists, utilizing at least one other processor core within others of the plurality of processor cores to perform the at least one scenario task, wherein a number of the at least one other processor core is greater than or equal to the minimum processor core count and an operating frequency of the at least one other processor core is greater than or equal to the minimum operating frequency.

3. The method of claim 1, wherein the step of obtaining the task-related information to determine whether the task of the plurality of tasks is the heavy task to selectively utilize the specific processor core within the plurality of processor cores to perform the task further comprises:
when the task is the heavy task, utilizing the specific processor core to perform the task.

4. The method of claim 3, wherein the step of obtaining the task-related information to determine whether the task of the plurality of tasks is the heavy task to selectively utilize the specific processor core within the plurality of processor cores to perform the task further comprises:
when the task is the heavy task, utilizing the specific processor core to perform the task with the specific processor core operating at a highest operating frequency thereof.

5. The method of claim 1, wherein the obtaining of the task-generated information comprises:
performing loading measurement on the task to generate a loading measurement result; and
generating the task-related information according to the loading measurement result.

6. The method of claim 5, wherein the step of obtaining the task-related information to determine whether the task of the plurality of tasks is the heavy task to selectively utilize the specific processor core within the plurality of processor cores to perform the task further comprises:
when the loading measurement result reaches a predetermined threshold, determining that the task of the plurality of tasks is the heavy task.

7. The method of claim 1, wherein the step of obtaining the task-related information to determine whether the task of the plurality of tasks is the heavy task to selectively utilize the specific processor core within the plurality of processor cores to perform the task further comprises:
when the task is the heavy task, utilizing a set of specific processor cores within the plurality of processor cores to perform a set of predefined heavy tasks, respectively, the set of specific processor cores corresponding to highest computing capability with respect to the plurality of processor cores.

8. The method of claim 1, wherein the task-related information is obtained from a program module running on the electronic device.

9. The method of claim 1, wherein the method is applied to at least one processor in the electronic device, and the at least one processor comprises the plurality of processor cores.

10. An apparatus for performing processor resource allocation in an electronic device, the apparatus comprising at least one portion of the electronic device, the apparatus comprising:
a plurality of processor cores, positioned within the electronic device, arranged for selectively performing operations for the electronic device; and
a control circuit, embedded within the plurality of processor cores or positioned outside the plurality of processor cores, arranged for obtaining task-related information to determine whether a task of a plurality of tasks is a heavy task, to selectively utilize a specific processor core within the plurality of processor cores to perform the task, and determining whether at least one scenario task exists within others of the plurality of tasks, to selectively determine according to application requirements a minimum processor core count and a minimum operating frequency for performing the at least one scenario task,
wherein the control circuit performs processor resource allocation according to a power table and system loading, to perform any remaining portion of the plurality of tasks,
wherein the task-related information comprises a queue time and an execution time, the queue time representing a time period that the task is in a queue, the execution time representing a time period for execution of the task, and
wherein the task is determined to be the heavy task in response to a derivative of the queue time and the execution time satisfying a predetermined criterion.

11. The apparatus of claim 10, wherein when the at least one scenario task exists, the control circuit utilizes at least one other processor core within others of the plurality of processor cores to perform the at least one scenario task, wherein a number of the at least one other processor core is greater than or equal to the minimum processor core count and an operating frequency of the at least one other processor core is greater than or equal to the minimum operating frequency.

12. The apparatus of claim 10, wherein when the task is the heavy task, the control circuit utilizes the specific processor core to perform the task.

13. The apparatus of claim 12, wherein when the task is the heavy task, the control circuit utilizes the specific processor core to perform the task with the specific processor core operating at a highest operating frequency thereof.

14. The apparatus of claim 10, wherein, in obtaining the task-related information, the control circuit performs loading measurement on the task to generate a loading measurement result, and generates the task-related information according to the loading measurement result.

15. The apparatus of claim 14, wherein when the loading measurement result reaches a predetermined threshold, the control circuit determines that the task of the plurality of tasks is the heavy task.

16. The apparatus of claim 10, wherein when the task is the heavy task, the control circuit utilizes a set of specific processor cores within the plurality of processor cores to perform a set of predefined heavy tasks, respectively, the set of specific processor cores corresponding to highest computing capability with respect to the plurality of processor cores.

17. The apparatus of claim 10, wherein the task-related information is obtained from a program module running on the electronic device.

18. The apparatus of claim 10, wherein the apparatus comprises at least one processor in the electronic device, and the at least one processor comprises the plurality of processor cores.

19. The apparatus of claim 18, wherein the control circuit is implemented with the at least one processor having at least one program module running thereon.

* * * * *